Feb. 4, 1964   W. L. BROWN   3,120,588
MULTIPLE PURPOSE DIRECTION SIGNALING APPARATUS
Filed Oct. 17, 1961   2 Sheets-Sheet 1

INVENTOR.
William L. Brown
BY
Learman, Learman & McCulloch
ATTORNEYS

Feb. 4, 1964    W. L. BROWN    3,120,588
MULTIPLE PURPOSE DIRECTION SIGNALING APPARATUS
Filed Oct. 17, 1961    2 Sheets-Sheet 2

INVENTOR.
William L. Brown
BY
Learman, Learman & McCulloch
ATTORNEYS

United States Patent Office 3,120,588
Patented Feb. 4, 1964

3,120,588
MULTIPLE PURPOSE DIRECTION SIGNALING APPARATUS
William L. Brown, Garden City, Mich., assignor to Boyne Products, Inc., Boyne City, Mich., a corporation of Michigan
Filed Oct. 17, 1961, Ser. No. 145,639
7 Claims. (Cl. 200—61.34)

This invention relates to direction signaling apparatus for motor vehicles, and more particularly to a direction signaling construction which is capable of performing a number of functions in addition to operating the direction signaling lamps of a vehicle.

Vehicle manufacturers currently are required by law to provide direction signaling apparatus as an integrated part of the vehicles. In the case of passenger cars, it usually is customary to provide left and right parking lamps at the front of the vehicle and left and right combination tail and stop lamps at the rear of the vehicle. Manipulation of the direction signal apparatus causes the appropriate set of front and rear lamps to flash in a well known manner so as to signal the making of a turn.

The operation of the direction signaling apparatus generally is manually initiated by the vehicle driver's actuating a lever or the like just before entering into the turn, and the signaling apparatus usually remains operative only for the length of time it takes to complete the turn. There are many instances where it would be convenient to employ auxiliary devices just prior to and during the making of a turn. For example, it would be desirable for a vehicle to have a more easily recognizable turning signal during daylight hours than may be required at night, inasmuch as the conventional flashing lamps are not as noticeable during daylight as they are at night. Moreover, it frequently would be helpful to a driver turning into an unfamiliar road or driveway at night if the area diagonally forwardly of the vehicle were illuminated. At least one vehicle manufacturer plans to include diagonally mounted turning lamps for its 1962 model vehicles, and such lamps could conveniently be operated from the direction signaling apparatus. There are many other kinds of auxiliary devices which either could be activated or deactivated upon the actuation of the direction signaling apparatus, but such devices do not themselves form any part of the invention per se.

An object of this invention is to provide direction signaling apparatus which permits vehicle manufacturers to retain their present lighting systems intact and which enables auxiliary devices to be operated concurrently with the operation of the usual signal lamps.

Another object of the invention is to provide signaling apparatus of the character described wherein both the usual direction signals and the auxiliary devices are operated by the same actuating means.

A further object of the invention is to provide apparatus of the character referred to which is selectively enabled for or disabled from operation at the will of the vehicle operator.

A further object of the invention is to provide apparatus for operating auxiliary devices of the character referred to which may be incorporated as part of conventional signaling apparatus currently in use.

Another object of the invention is to provide apparatus of the character described wherein the auxiliary devices may be either active or inactive when the direction signaling apparatus is inactive.

Other objects and advantages of the invention will be pointed out in detail or will become apparent from the following description when it is considered in conjunction with the appended claims and the accompanying drawings, wherein:

Figure 1:
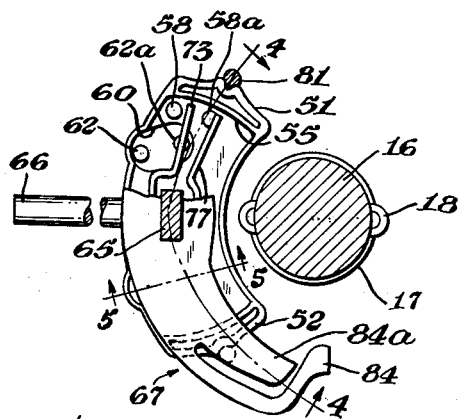
FIGURE 1 is a view partly in plan and partly in section of apparatus constructed in accordance with one embodiment of the invention, with certain parts being broken away for clarification.
Figure 2:
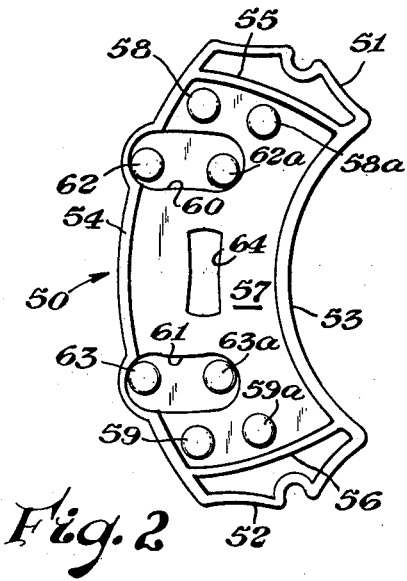
FIGURE 2 is an enlarged, plan view of the switch casing disclosed in FIGURE 1.
Figure 3:
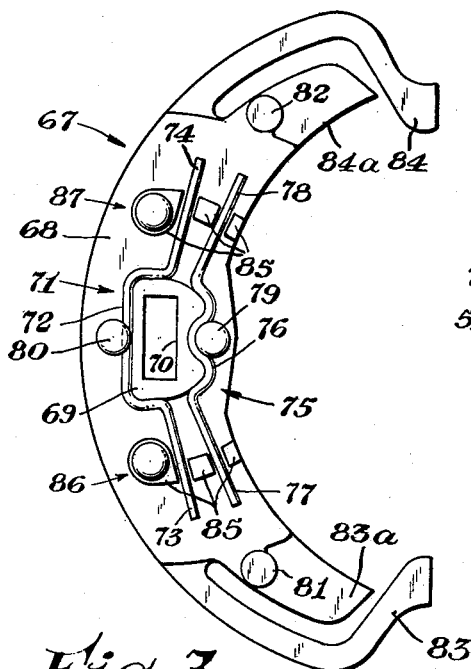
FIGURE 3 is an enlarged, bottom plan view of the actuating member disclosed in FIGURE 1.

The embodiment of the invention disclosed in FIGURES 1-5 is illustrated as being embodied in direction signaling apparatus of the kind disclosed in copending application Serial No. 131,243, filed August 14, 1961.

The direction signaling apparatus disclosed in FIGURES 1-5 includes a casing 50 formed of insulating material such as nylon, the casing being of arcuate configuration and having flexible detent ribs 51 and 52 at its opposite ends thereof. The casing includes side walls 53 and 54 and end walls 55 and 56 which, together with a base 57, define a chamber in which a plurality of electrically conductive contact elements or posts are mounted. Adjacent one end of the casing 53 is a set of contacts 58, 58a and adjacent the opposite end of the casing is a second set of contacts 59, 59a. Adjacent one end of the casing the base 57 is provided with a recess 60 and a similar recess 61 is formed in the base adjacent the opposite end of the casing. Fixed in the recess 60 is a pair of auxiliary circuit contacts 62, 62a and a similar pair of auxiliary contacts 63, 63a is fixed in the recess 61. Between the recesses 60 and 61 the base 57 is provided with a generally hourglass-shaped opening 64 through which a rectangular operating shaft 65 is adapted to extend and which is rockable relative to the casing 53. The shaft 65 may be joined in any suitable way to one end of an operating lever 66 for a purpose which presently will be explained.

The direction signaling apparatus includes an actuating member 67 which also is arcuate and which may be formed of insulating material such as nylon. The actuating member includes a central body portion 68 having a centrally located projection 69 on its under surface that is provided with a rectangular opening 70 of such size as snugly to receive the operating shaft 65 so as to permit the actuating member to be rocked in response to rocking of the shaft 65 by the lever 66.

Direction signal switch means is carried by the actuating member 67 and comprises an electrically conductive switch member 71 having a central web section 72 lying adjacent the projection 69 and terminating in oppositely extending arms 73 and 74 which extend toward the ends 55 and 56, respectively, when the casing and the actuating member are assembled. The switch means also includes an electrically conductive member 75 having a central web section 76 which lies adjacent the opposite side of the projection 69 and terminates in oppositely extending arms 77 and 78 which also extend toward the opposite ends of the casing when the parts are assembled. The web 76 of the member 75 constantly engages a contact post 79 carried by the actuating member, and the web 72 of the member 71 constantly engages a post 80 that similarly is carried by the actuating member.

The arrangement of the parts thus far described is such that, upon assembly of the casing and the actuating member, the arms 77 and 78 of the switch member 75 are in engagement with the contacts 58a, 59a, respectively, and the arms 73 and 74 lie between the respective sets of contacts at the opposite ends of the casing. Manipulation of the operating lever 66 in either a clockwise or a counterclockwise direction, however, will cause corresponding rocking of the actuating member 67 relative to the casing 50 so as to effect shifting of the switch members relatively to the contacts carried by the casing in a manner which will be pointed out more in detail hereinafter.

The actuating member 67 includes a pair of projecting detent fingers 81 and 82 which are adapted to bear against the respective ribs 51 and 52 formed at the opposite ends of the casing and yieldably maintain the actuating member in any selected one of its positions of adjustment. The actuating member 67 also includes a pair of resilient return fingers 83 and 84, either of which is adapted to be projected into the path of rotation of the cams 18 upon rocking movement of the actuating member from its neutral position in a predetermined direction to one of its actuated positions. Engagement of the projected return finger by a cam 18 upon rotation of the steering shaft 16 in the appropriate direction will cause the engaged finger to bear against an associated abutment 83a or 84a formed on the actuating member and return the latter from its actuated position to its neutral position. Inasmuch as the switch members 71 and 75 are carried by the actuating member 67, they will move with the latter upon rocking movement thereof to and from its actuated position. In order to prevent undesirable flexure of the switch arms 73, 74 and 77, 78 during movement of the actuating member the under surface of the body 68 of the actuating member is provided with depending projections 85 between which the arms extend.

Figure 4:
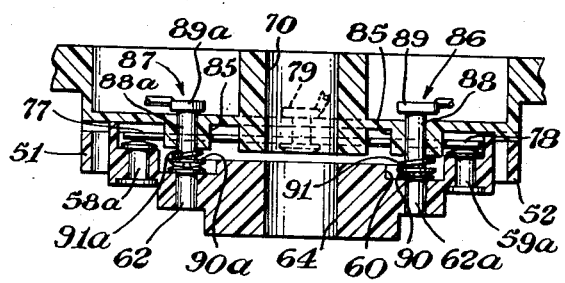
FIGURE 4 is a longitudinal section taken on the line 4—4 of FIGURE 1.
Figure 5:
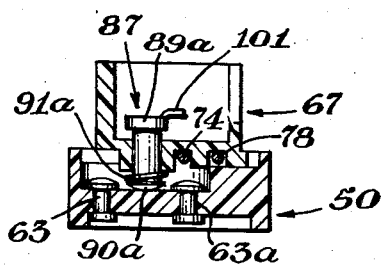
FIGURE 5 is a transverse section taken on the line 5—5 of FIGURE 1.

The apparatus includes auxiliary switch contacts 86 and 87 supported by the actuating member 67 for engaging the auxiliary contact posts mounted in the casing. In the embodiment disclosed in FIGURES 1–5, the auxiliary contacts comprise a pair of electrically conductive studs slideably mounted in corresponding projections 85 for movements toward and away from the casing 50. The contact 86 includes a shank 88 having a peripheral flange 89 at one end and a crowned head 90 at its other end. A spring 91 surrounds the shank 88 and reacts between the head 90 and the lower face of the projection 85 to bias the stud 86 toward the base of the recess 60, and the length of the shank 88 is such as to insure engagement between the head 90 and the contacts 62, 62a. The contact 87 is similar in all respects to the contact 86 and similar parts are identified by similar reference characters followed by the suffix "a." The size of the heads 90 and 90a of the respective contacts 86 and 87 are such that, in the neutral position of the actuating member, the contacts 86 and 87 lie between their associated contacts 58, 58a and 59, 59a, so as to be disengaged therefrom, as is shown in FIGURES 4 and 5. Upon movement of the actuating member counterclockwise from its neutral position, as is viewed in FIGURE 1, the contact 86 will engage the contact 62, and the contact 87 will engage the contact 59a. Counterclockwise rocking of the actuating member from the position shown in FIGURE 1 will effect engagement between the contacts 86 and 58a and between the contacts 87 and 63.

Figure 7:
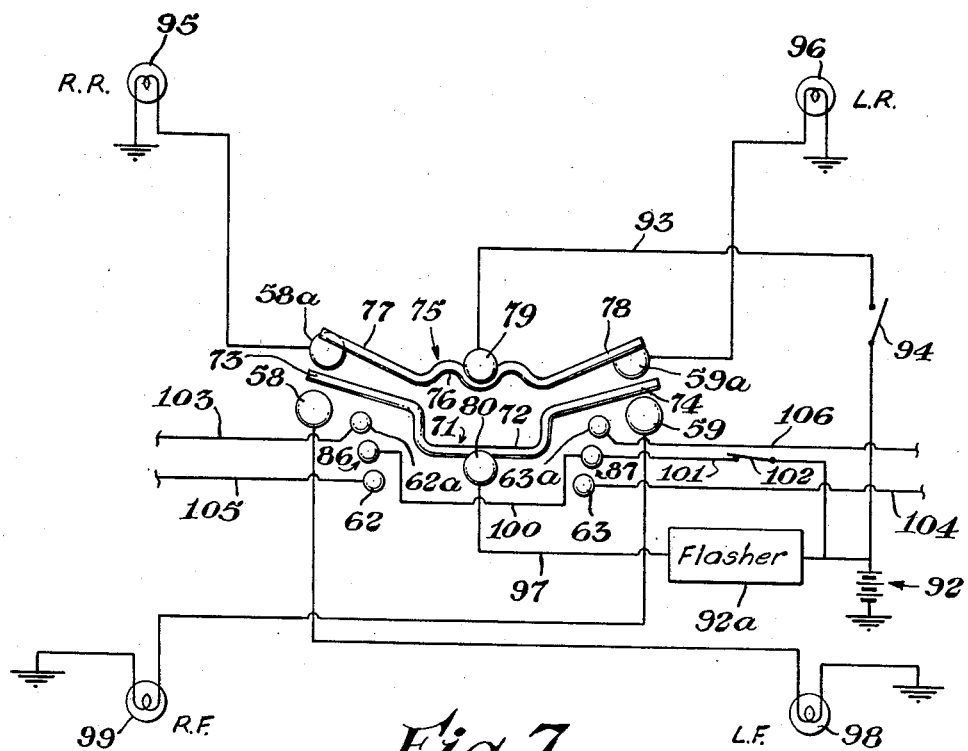
FIGURE 7 is a schematic wiring diagram illustrating a circuit adapted for use with the apparatus shown in FIGURES 1-6.

Apparatus of the kind shown in FIGURES 1–5 may be incorporated in a circuit such as that illustrated in FIGURE 7, wherein a battery 92 has one of its terminals grounded and its other terminal connected by a wire 93 to the contact 79 through a normally open switch 94 that is adapted to be closed upon the application of the vehicle's brakes in the conventional manner. The contacts 58a and 59a are respectively connected to a right rear stop lamp 95 and a left rear stop lamp 96, and thence to ground. The arrangement is such that, when the actuating member is in its neutral position, the switch member 75 connects both of the stop lamps 95 and 96 to the contact post 79 so that closing of the switch 94 will cause the lamps 95 and 96 to be illuminated.

The contact post 80 is connected by a wire 97 to the battery 92 through a conventional flasher unit 92a. The contact 58 is connected to ground through the vehicle's left front parking lamp 98 and the contact 59 is connected to ground through the vehicle's right front front parking lamp 99. In the neutral position of the actuating member, neither of the switch arms 73 and 74 engages any of the stationary contacts supported on the casing, so neither of the front lamps 99 and 98 can be illuminated through the turn signaling apparatus. Upon movement of the actuating member in a counterclockwise direction, as viewed in FIGURE 7, the switch arm 73 will be moved a distance to engage the contact 58 and the switch arm 74 will be moved a distance to engage the contact 59a. The arm 77 will move relatively to the contact 58 the same distance as the other arms, but in such a direction that it will not be disengaged therefrom. The arm 78, however, will be moved in such a direction relatively to the contact 59a as to be disengaged therefrom. In these positions of the parts, a circuit will be completed from the battery through the flasher and through the switch member 71 to the contacts 58 and 59a so as to cause flashing of the left rear and left front lamps 96 and 98. However, closing of the switch 94 will enable the right rear lamp 95 to glow continuously since the arm 77 continues to engage the contact 58a. Rocking of the actuating member and the switch members 71 and 75 clockwise from the position shown in FIGURE 7 will cause the right rear and the right front lamps 95 and 99 to flash, but will not prevent illumination of the left rear lamp 96 upon closing of the switch 94.

The contacts 86 and 87 are joined by a wire 100 and the contact 90a is connected by a wire 101 to the battery through a switch 102, if desired. The arrangement is such that clockwise rocking of the actuating member will effect clockwise rocking of the contacts 86 and 87 from the positions shown in FIGURE 7 an amount such that the head 90 of the contact 86 will engage the contact 62a, and the head 90a of the contact 87 will engage the contact 63. If the switch 102 is closed, energy will be supplied from the battery 92 through the contacts 86, 87 and through the wire 100 to each of the contacts 62a and 63. These contacts may be connected to auxiliary devices (not shown) by wires 103 and 104, respectively.

Should the actuating member be rocked counterclockwise from its neutral position so as to shift the contacts 86 and 87 in a counterclockwise direction from the positions shown in FIGURE 7, the contact 86 will engage the contact 62 and the contact 87 will engage the contact 63a so as to complete a circuit from the battery 92 through the contacts 62 and 63a to other auxiliary devices (not shown), the contacts 62 and 63a having wires 105 and 106, respectively, connected to and extending therefrom for connection to the auxiliary devices.

The auxiliary devices adapted to be actuated by the auxiliary contacts 90 and 90a may be auxiliary signaling lamps, in which event an additional flasher unit could be incorporated in the line 101. Moreover, the switch 102 may be manually operable so as to condition the auxiliary circuit for operation when desired.

Figure 6:
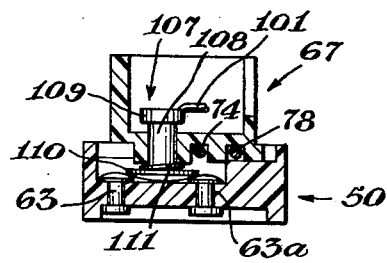
FIGURE 6 is a view similar to FIGURE 5, but illustrating a modification.

In some instances it may be desirable for the auxiliary circuit to be energized whenever the direction signaling apparatus is in its neutral position and deenergized when the direction signaling apparatus is actuated. Such a result can be affected by substituting for each of the auxiliary contacts 86 and 87 an enlarged contact of the kind shown at 107 in FIGURE 6. The contact 107 comprises a stud having a shank 108 slideably mounted in the actuating member 67 and having a flange 109 at one end and a crowned head 110 at its other end of such diameter as to bridge the distance between the contacts 63, 63a when the actuating member is in its neutral position. A spring 111 may react between the head 110 and the actuating member's body to bias the contact toward the casing 50. Upon movement of the actuating member from its neutral position to either of its actuated positions, the head 110 of the contact 107 will be disengaged from one of the contacts 63, 63a so as to break the circuit between them. In all other respects the apparatus shown in FIGURE 6 is the same as that earlier described.

The disclosed embodiments are illustrative of presently preferred forms of the invention, but are susceptible of further modifications. The disclosure therefore is intended to be illustrative of the invention rather than definitive thereof. The invention is defined in the claims.

I claim:

1. Direction signaling apparatus comprising a casing member; a nonconductive actuating member; operating means connected to one of said members for effecting relative movement of said members from a neutral position; a plurality of contact elements supported by one of said members; switch means connected to the movable one of said members and operable in response to movement of the latter to move into and out of engagement with selected elements of said contact elements; contact means independent of said contact elements and said switch means supported by one of said members; and conductive auxiliary switch means connected to the other of said members and movable relatively to said one of said members into and out of engagement with said contact means in response to movement of the movable one of said members.

2. Direction signaling apparatus comprising a casing member; a plurality of contact elements supported by said casing member; a nonconductive actuating member; means mounting said actuating member for rocking movement about an axis from a neutral position; operating means connected to said actuating member for rocking the latter relatively to said casing member from said neutral position; switch means connected to said actuating member and rockable with the latter into and out of engagement with selected elements of said contact elements; contact means independent of said contact elements supported by one of said members; and conductive auxiliary switch means connected to the other of said members and movable relatively to said one of said members into and out of engagement with said contact means in response to rocking movement of said actuating member.

3. Direction signaling apparatus comprising a casing member; a plurality of contact elements supported by said member; a nonconductive actuating member; means connected to said actuating member for moving the latter relatively to said casing member from and to a neutral position; switch means connected to said actuating member and movable with the latter into and out of engagement with selected elements of said contact elements; contact means independent of said contact elements supported by said casing member; and conductive auxiliary switch means connected to said actuating member and movable therewith into and out of engagement with said contact means.

4. Direction signaling apparatus comprising an arcuate casing member; an arcuate, nonconductive actuating member mounted on said casing member for rocking movements from and to a neutral position about an axis passing between the ends of said casing member; a plurality of contact elements supported by said casing member at least on one side of said axis; switch means connected to said actuating member and movable into and out of engagement with selected elements of said contact elements in response to rocking movement of said actuating member; contact means independent of said contact elements supported by one of said members on at least one side of said axis; conductive auxiliary switch means connected to the other of said members and movable relatively to said auxiliary contact means into and out of engagement therewith in response to rocking movement of said actuating member; and means connected to said actuating member for rocking the latter.

5. The apparatus set forth in claim 4 wherein said contact means are supported by said casing member and said auxiliary switch means are connected to said actuating member.

6. Direction signaling apparatus comprising a casing member; a nonconductive actuating member; means pivotally mounting said actuating member for rocking movements from a neutral position to operating positions on opposite sides of said neutral position; operating means connected to said actuating member for rocking the latter relatively to said casing member; a plurality of electrical contact elements supported by one of said members; switch means connected to the other of said members and operable in response to rocking movement of said actuating member to move into and out of engagement with selected elements of said contact elements; first conductive auxiliary contact means independent of said contact elements and said switch means and supported on said casing member; and second conductive auxiliary contact means supported on said actuating member for movement in response to rocking movement of the latter into and out of engagement with said first auxiliary contact means.

7. The apparatus set forth in claim 6 wherein said second auxiliary contact means comprises an electrically conductive part slideably mounted in said actuating member for movements toward and away from said first auxiliary contact means, and including means acting on said part to urge the latter toward said first auxiliary contact means.

References Cited in the file of this patent

UNITED STATES PATENTS

| | | |
|---|---|---|
| 1,526,113 | Bolton et al. | Feb. 1, 1925 |
| 1,594,474 | Slayton | Aug. 3, 1926 |
| 2,891,118 | Hollins | June 16, 1959 |
| 2,930,859 | Nolden et al. | Mar. 29, 1960 |
| 2,999,911 | Dryer et al. | Sept. 12, 1961 |